United States Patent
Lin et al.

(10) Patent No.: US 11,886,035 B2
(45) Date of Patent: Jan. 30, 2024

(54) OPTICAL MECHANISM AND LENS MODULE THEREOF

(71) Applicant: TDK TAIWAN CORP., Taoyuan (TW)

(72) Inventors: Yu-Cheng Lin, Taoyuan (TW); Chen-Chi Kuo, Taoyuan (TW); Kun-Shih Lin, Taoyuan (TW); Fu-Yuan Wu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 129 days.

(21) Appl. No.: 17/538,338

(22) Filed: Nov. 30, 2021

(65) Prior Publication Data

US 2022/0091359 A1 Mar. 24, 2022

Related U.S. Application Data

(62) Division of application No. 16/047,812, filed on Jul. 27, 2018, now Pat. No. 11,215,783.

(Continued)

(30) Foreign Application Priority Data

Jun. 11, 2018 (CN) .......................... 201810596822.9

(51) Int. Cl.
*G02B 7/04* (2021.01)
*G02B 13/00* (2006.01)
(Continued)

(52) U.S. Cl.
CPC .................. *G02B 7/04* (2013.01); *G02B 7/08* (2013.01); *G02B 13/009* (2013.01); *H02K 41/00* (2013.01)

(58) Field of Classification Search
CPC .......... G02B 7/08; G02B 27/646; G02B 7/09; G02B 7/102; G02B 13/0065; G02B 7/023; G02B 13/009; G02B 3/14; G02B 13/004; G02B 13/0075; G02B 26/004; G02B 26/0816; G02B 26/0883; G02B 27/0068; G02B 27/0955; G02B 27/0972; G02B 27/0977; G02B 3/12; G02B 5/003; G02B 6/0025; G02B 6/0066; G02B 7/1805; G02B 7/182; G02B 7/1821; G02B 7/1828; G02B 7/028; G02B 7/022; G02B 7/026;

(Continued)

(56) References Cited

U.S. PATENT DOCUMENTS

| 2008/0106632 | A1 | 5/2008 | Yuan | |
| 2013/0170052 | A1* | 7/2013 | Yu | G02B 27/646 |
| | | | | 359/813 |
| 2015/0364980 | A1* | 12/2015 | Liao | H02K 41/0356 |
| | | | | 310/12.16 |

FOREIGN PATENT DOCUMENTS

CN 208314299 U 1/2019

OTHER PUBLICATIONS

Chinese Office Action issued in corresponding Application No. CN201810596822.9, dated Mar. 10, 2021, 3 pages.

* cited by examiner

*Primary Examiner* — Brandi N Thomas
(74) *Attorney, Agent, or Firm* — Muncy, Geissler, Olds & Lowe, P.C.

(57) ABSTRACT

A lens module is provided, including a holder, a barrel, and an optical element. The optical element is affixed in the barrel, and the holder has a first material. Additionally, the barrel is affixed in the holder and has a second material, wherein the hardness of the first material is greater than the hardness of the second material.

19 Claims, 21 Drawing Sheets

Related U.S. Application Data

(60) Provisional application No. 62/538,269, filed on Jul. 28, 2017.

(51) Int. Cl.
*H02K 41/00* (2006.01)
*G02B 7/08* (2021.01)

(58) Field of Classification Search
CPC ...... G02B 7/04; G02B 6/4206; G02B 6/4218; G02B 13/005; G02B 21/26; G02B 23/2476; G02B 26/0875; G02B 7/10; G02B 13/0045; G02B 15/00; G02B 26/005; G02B 26/06; G02B 5/005; G02B 7/005; G02B 7/008; G02B 7/38; G02B 15/143; G02B 7/00; G02B 7/02; G02B 1/06; G02B 13/001; G02B 27/64; G02B 7/021; G02B 7/28; G03B 5/00; G03B 13/36; G03B 2205/0069; G03B 2205/0007; G03B 2205/0015; G03B 5/04; G03B 9/06; G03B 17/17; G03B 9/04; G03B 9/10; G03B 9/14; G03B 3/10; G03B 30/00; G03B 17/12; G03B 5/02; G03B 2205/0046; G03B 17/00; G03B 17/04; G03B 21/00; G03B 2205/00; H04N 23/55; H04N 23/57; H04N 23/54; H04N 23/51; H04N 23/45; H04N 23/56; H04N 23/73; H04N 23/687; H04N 23/68; H04N 23/6812; H04N 23/00; H04N 23/67; H04N 23/50; H04N 23/685; H04N 13/322; H04N 13/363; H04N 23/60; H04N 23/682; H04N 23/686
See application file for complete search history.

OPTICAL MECHANISM AND LENS MODULE THEREOF

CROSS REFERENCE TO RELATED APPLICATIONS

This application is a Divisional Application of U.S. patent application Ser. No. 16/047,812, filed on Jul. 27, 2018, which claims the benefit of U.S. Provisional Application No. 62/538,269, filed on Jul. 28, 2017 and China Patent Application No. 201810596822.9 filed on Jun. 11, 2018, the entirety of which is incorporated by reference herein.

BACKGROUND OF THE INVENTION

Field of the Invention

The application relates in general to a driving mechanism, and in particular, to an optical mechanism having a lens module.

Description of the Related Art

As technology has advanced, a lot of electronic devices (such as cameras and smartphones) have incorporated the functionality of taking photographs and recording video. These electronic devices have become more commonplace, and have been developed to be more convenient and thin.

In some electronic devices, several coils and magnets corresponding thereto are usually used for adjusting the focus of a lens. However, miniaturization of the electronic devices may increase the difficulty of mechanical design, and it may also lead to low reliability and low driving force for moving the lens. Therefore, addressing the aforementioned problems has become a challenge.

BRIEF SUMMARY OF INVENTION

In view of the aforementioned problems, the object of the invention is to provide a lens module that includes a holder, a barrel, and an optical element. The optical element is affixed in the barrel, and the holder has a first material. Additionally, the barrel is affixed in the holder and has a second material, wherein the hardness of the first material is greater than the hardness of the second material.

Another object of the invention is to provide an optical mechanism that includes a lens module, a fixed module, a driving assembly, and a first resilient element. The lens module includes a holder, a barrel, and an optical element, wherein the barrel is affixed in the holder, and the optical element is affixed in the barrel. The holder includes a hollow main body and a restricting portion. The main body has a connection surface, and the restricting portion has an upper surface and protrudes outward from the main body in a horizontal direction perpendicular to an optical axis of the optical element. The driving assembly has a coil and a magnet for driving the lens module to move relative to the fixed module, wherein the restricting portion restricts the coil in a predetermined position on the holder. The first resilient element has a first connecting portion, a second connecting portion, and a deformable portion connecting the first connecting portion with the second connecting portion, wherein the first and second connecting portions respectively connect to the fixed module and the connection surface of the main body, and the upper surface faces the deformable portion. Specifically, the upper surface and the first resilient element are spaced apart from each other and at least partially overlap along the optical axis.

In some embodiments, the holder further has a recessed portion adjacent to the restricting portion and between the main body and the coil, wherein the recessed portion is concave toward the inside of the main body, and the coil directly faces at least a part of the deformable portion along the optical axis.

In some embodiments, the deformable portion forms a hollow T-shaped structure.

In some embodiments, the optical mechanism further includes a second resilient element having a third connecting portion and a fourth connecting portion respectively connected to the fixed nodule and the holder, wherein the magnet has a first height along the optical axis, a first distance is formed between the second and fourth connecting portions along the optical axis, and the first height is greater than the first distance.

In some embodiments, a second distance is formed between the first and third connecting portions along the optical axis, and the second distance is greater than the first height.

Another object of the invention is to provide an optical mechanism that includes a housing, a lens module, a driving assembly, and a first resilient element. The housing forms an inner surface. The lens module is disposed in the housing and including a holder, a barrel, and an optical element, wherein the barrel is affixed in the holder, the optical element is affixed in the barrel, and the holder has a connection surface and a protrusion protruding from the connection surface toward the housing, and the protrusion has a top surface facing the housing. The driving assembly has a coil and a magnet for driving the lens module to move relative to the fixed module. The first resilient element connects the inner surface of the housing with the connection surface of the holder, wherein when the lens module is in an initial position relative to the housing, the top surface of the protrusion has a height between the connection surface and the inner surface, and when the lens module moves toward the housing to a limit position, the top surface contacts the housing to restrict the lens module in the limit position.

In some embodiments, the housing has a top portion and four sidewall portions, and a depressed structure is formed at a corner of the top portion and located adjacent to one of the four sidewall portions, wherein the depressed structure and the magnet at least partially overlap when viewed along the optical axis of the lens module.

In some embodiments, the depressed structure includes a substantially triangular main portion and a longitudinal portion extending along an edge of the top portion, and the longitudinal portion and the magnet at least partially overlap when viewed along the optical axis.

In some embodiments, the optical mechanism further includes a quadrilateral base forming an abutting surface located at a corner of the base, perpendicular to the optical axis of the lens module, and abutting the housing.

In some embodiments, the optical mechanism further includes a quadrilateral base having a bottom plate and a protrusion protruding from the bottom plate and toward the magnet, wherein the protrusion forms an outer surface adjacent to the housing and substantially parallel to the optical axis of the lens module.

In some embodiments, the base further has two protrusions and a recess, and the recess is formed between the two protrusions and corresponds to the magnet.

In some embodiments, the recess forms a sloped surface that extends toward the housing to an edge of the base.

In some embodiments, the holder further has a hollow main body and a restricting portion, the connection surface is formed on the main body, and the restricting portion protrudes outward from the main body along a horizontal direction to restrict the coil in a predetermined position on the holder, wherein the horizontal direction is perpendicular to the optical axis of the lens module, and the restricting portion and the magnet at least partially overlap when viewed along the horizontal direction.

In some embodiments, the optical mechanism further includes a conductive wire connected to the coil, and the holder further has a leg with the conductive wire wound thereon, wherein the leg and the magnet at least partially overlap when viewed along the horizontal direction.

In some embodiments, the magnet has a first height along the optical axis of the lens module, and the coil has a second height along the optical axis, wherein the first height is greater than twice the second height.

In some embodiments, the connection surface is located on a side of the restricting portion, and the protrusion directly connects to the restricting portion, wherein the coil and the protrusion at least partially overlap when viewed along the optical axis of the lens module.

In some embodiments, the optical mechanism further includes a base, a conductive member, and a second resilient element connecting the base with the holder, wherein the housing is affixed to the base, and the conductive member is electrically connected to the coil and has an embedded portion embedded in the base, wherein the base forms a fixed surface, and the second resilient element has an end portion affixed to the fixed surface, wherein the projection area of the embedded portion onto the fixed surface is smaller than the projection area of the end portion onto the fixed surface.

In some embodiments, the top surface of the protrusion and the limit position have a first height difference along the optical axis of the lens module, and the inner surface and the limit position have a second height difference along the optical axis, wherein the first height difference is greater than the second height difference.

In some embodiments, the connection surface and the top surface have a third height difference along the optical axis, and the third height difference is greater than the second height difference.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the optical mechanism and the lens module thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

In the following detailed description of the preferred embodiments, reference is made to the accompanying drawings, and in which specific embodiments of which the invention may be practiced are shown by way of illustration. In this regard, directional terminology, such as "top," "bottom," "left," "right," "front," "back," etc., is used with reference to the orientation of the figures being described. The components of the present invention can be positioned in a number of different orientations. As such, the directional terminology is used for the purposes of illustration and is in no way limiting.

Figure 1:
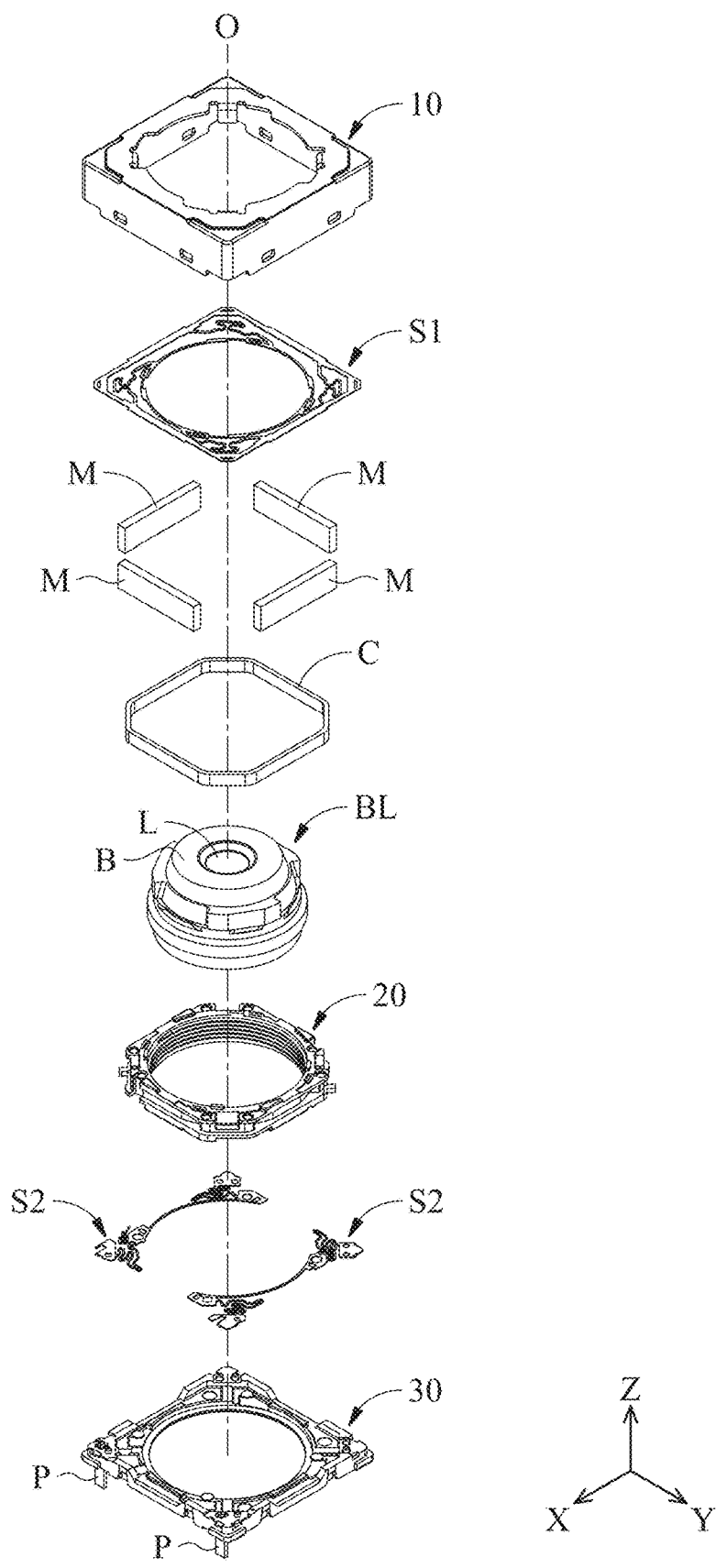
FIG. 1 is an exploded diagram showing an optical mechanism according to an embodiment of the invention.

FIG. 1 is an exploded diagram showing an optical mechanism according to an embodiment of the invention. In this embodiment, the optical mechanism may be disposed in a portable electronic device such as a cell phone or tablet computer, and at least one optical lens is disposed in the optical mechanism. As shown in FIG. 1, the optical mechanism primarily comprises a housing 10, at least a first resilient element S1, at least a magnet M, a coil C, a lens unit BL, a hollow holder 20, at least a second resilient element S2, and a base 30. The lens unit BL is affixed in the holder 20 and defines an optical axis O parallel to the Z axis. The housing 10 and the base 30 are affixed to each other to constitute a fixed module, and the holder 20 and the lens unit BL constitute a lens module movably received in the fixed module.

The coil C is disposed around the holder 20, and the magnets M are affixed to an inner surface of the housing 10, corresponding to the coil C. It should be noted that the coil C and at least one of the magnets M can constitute an electromagnetic driving assembly for driving the lens module (the lens unit BL and the holder 20) to move relative to the fixed module (the housing 10 and the base 30) along the Z axis. In this embodiment, the first resilient element S1 may comprise a metal spring sheet connecting the housing 10 with the holder 20, and the second resilient element S2 may comprise a metal spring sheet connecting the base 30 with the holder 20. Therefore, the lens unit BL and the holder 20 can be suspended within the inner space formed by the housing 10 and the base 30.

It should be noted that the housing 10, the first resilient element S1, the magnets M, the coil C, the second resilient elements S2, and the base 30 can form a Voice Coil Motor (VCM) to move the lens unit BL and the holder 20 along the Z axis. In this embodiment, the coil C can be electrically connected to an external circuit via the second resilient element S2 and two conductive members P disposed on the base 30. When an electrical current is applied to the coil C from the external circuit, a magnetic force can be generated between the coil C and the magnet M, and the lens unit BL (including the lens unit BL and the holder 20) can be driven by the magnetic force to move relative to the housing 10 and the base 30 along the Z axis, thus achieving Autofocusing (AF) or Optical Image Stabilization (OIS) of the optical mechanism.

Figure 2:
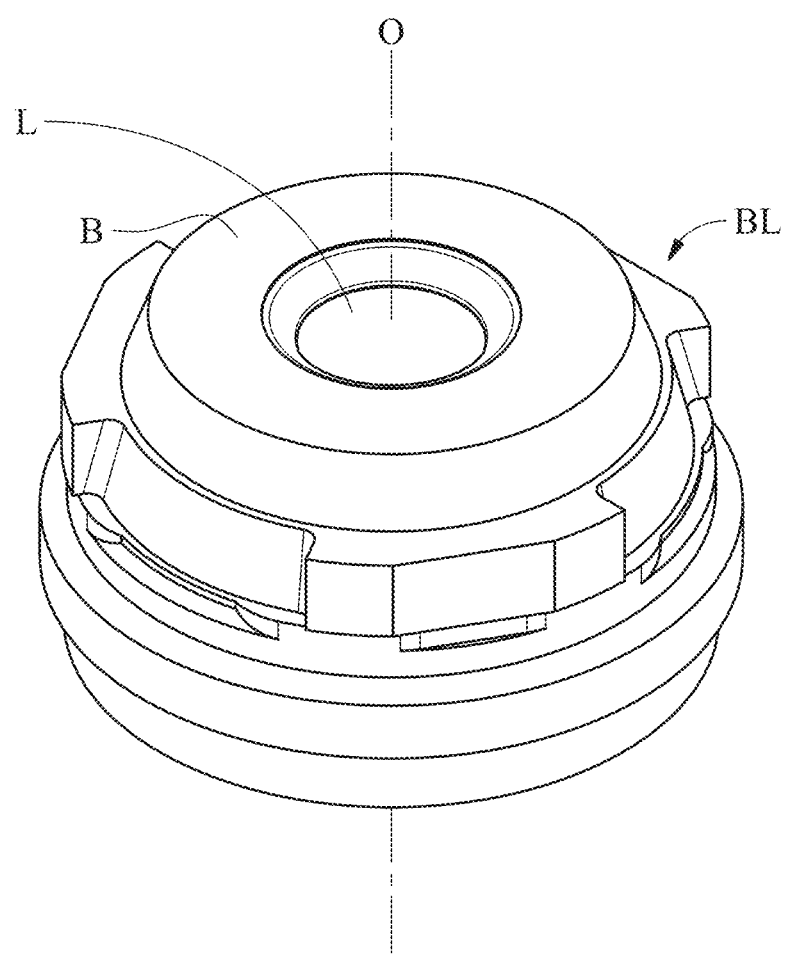
FIG. 2 is a perspective diagram showing the lens unit BL in FIG. 1.

Referring to FIGS. 1 and 2, the lens unit BL can be secured in the holder 20 by adhesion or corresponding threaded structures formed thereon. In this embodiment, the lens unit BL comprises a barrel B and at least an optical element L (e.g. optical lens) affixed therein. Specifically, the holder 20 comprises a first material, and the barrel B comprises a second material different from the first material, wherein the hardness of the first material is greater than that of the second material. It should be noted that the holder 20 is preferably harder than the barrel B because it has to hold and protect the barrel B and the lens unit BL. In contrast, since the barrel B is used to receive the optical element L, the assembly process thereof would be difficult if the barrel B uses a hard material. Thus, the barrel B can use a relatively flexible material to increase accuracy of assembly between the barrel B and the optical element L.

Figure 3:
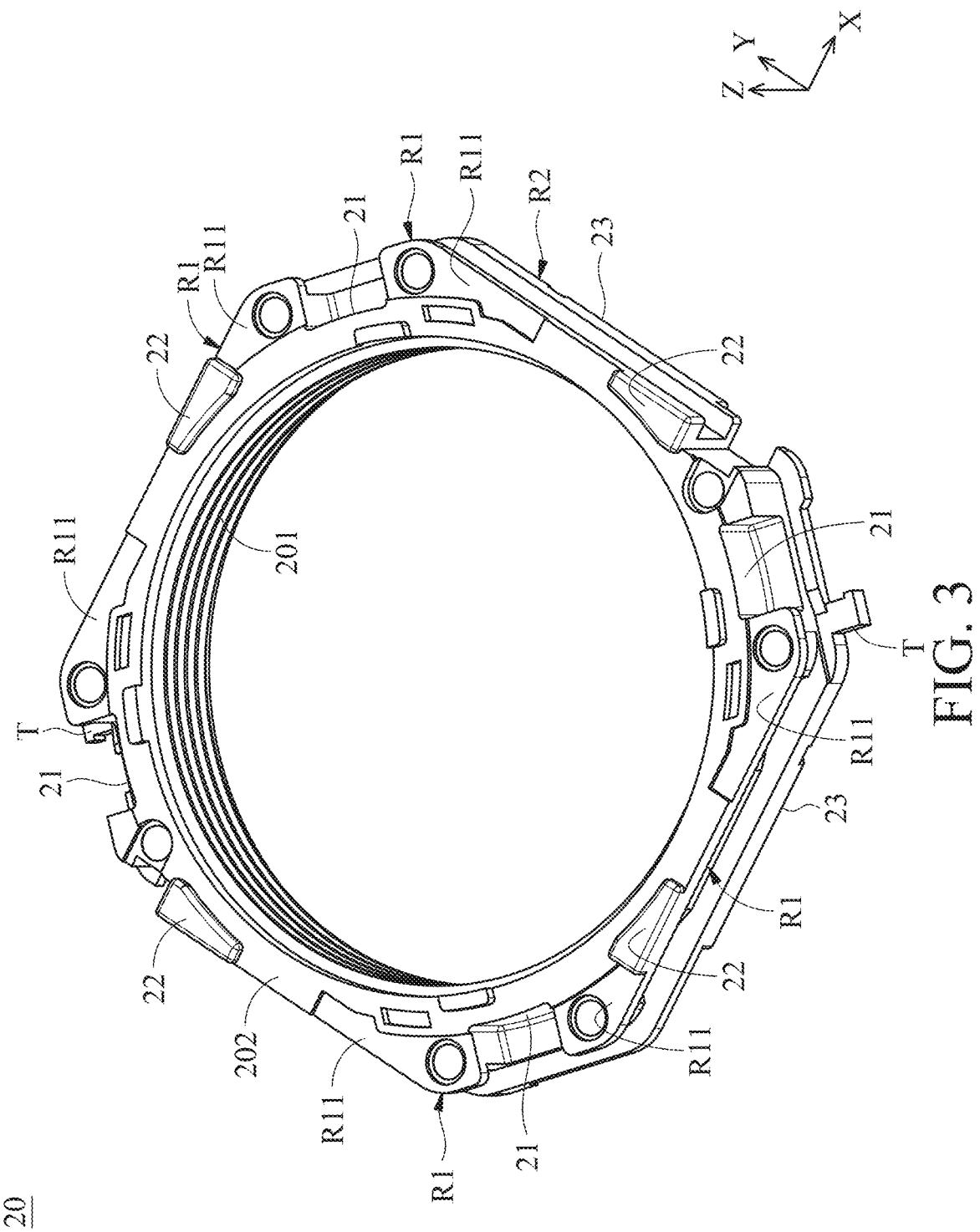
FIGS. 3 and 4 are perspective diagrams showing the holder 20 in FIG. 1 from different viewing angles.
Figure 4:
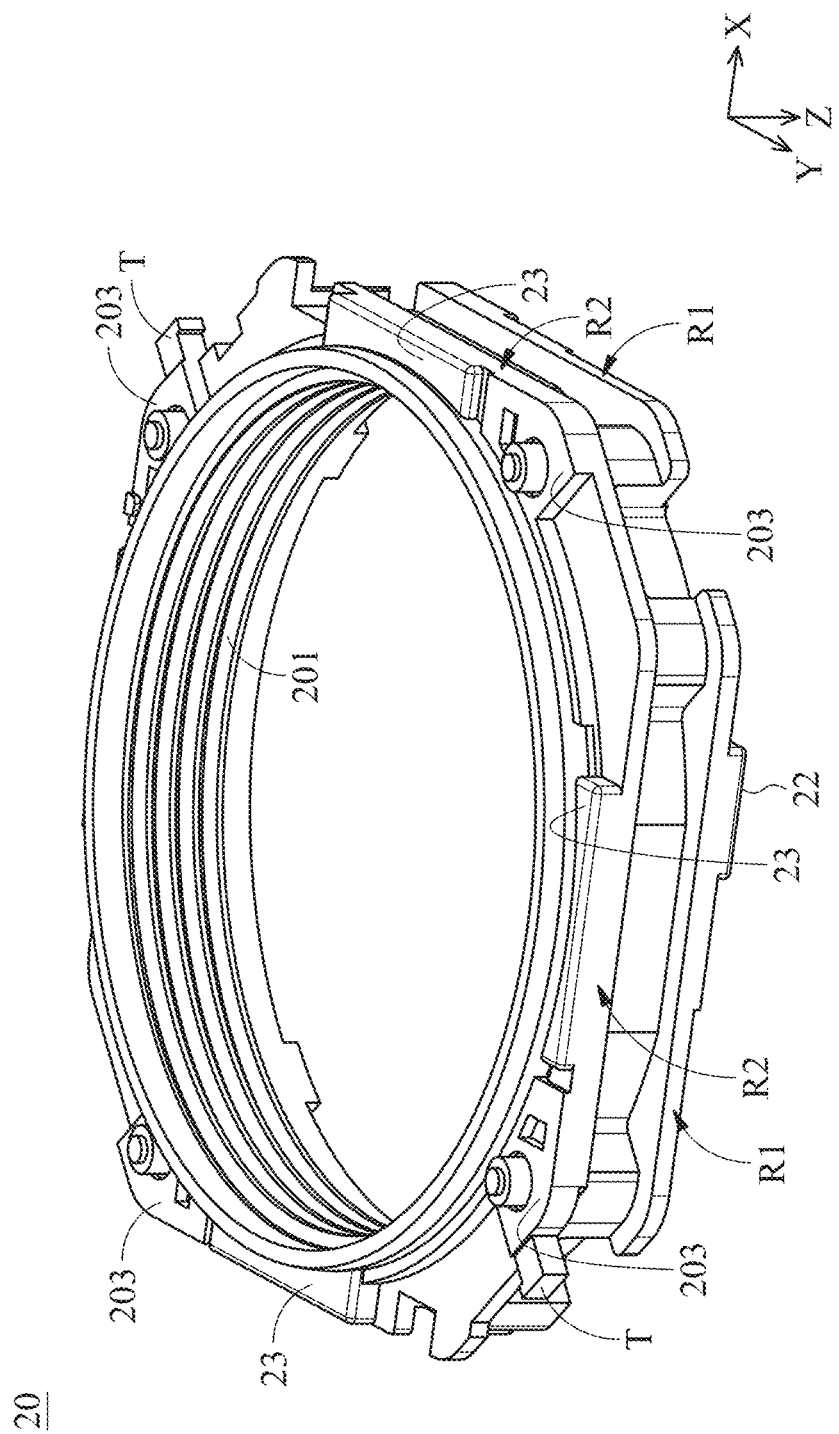
Figure 5:
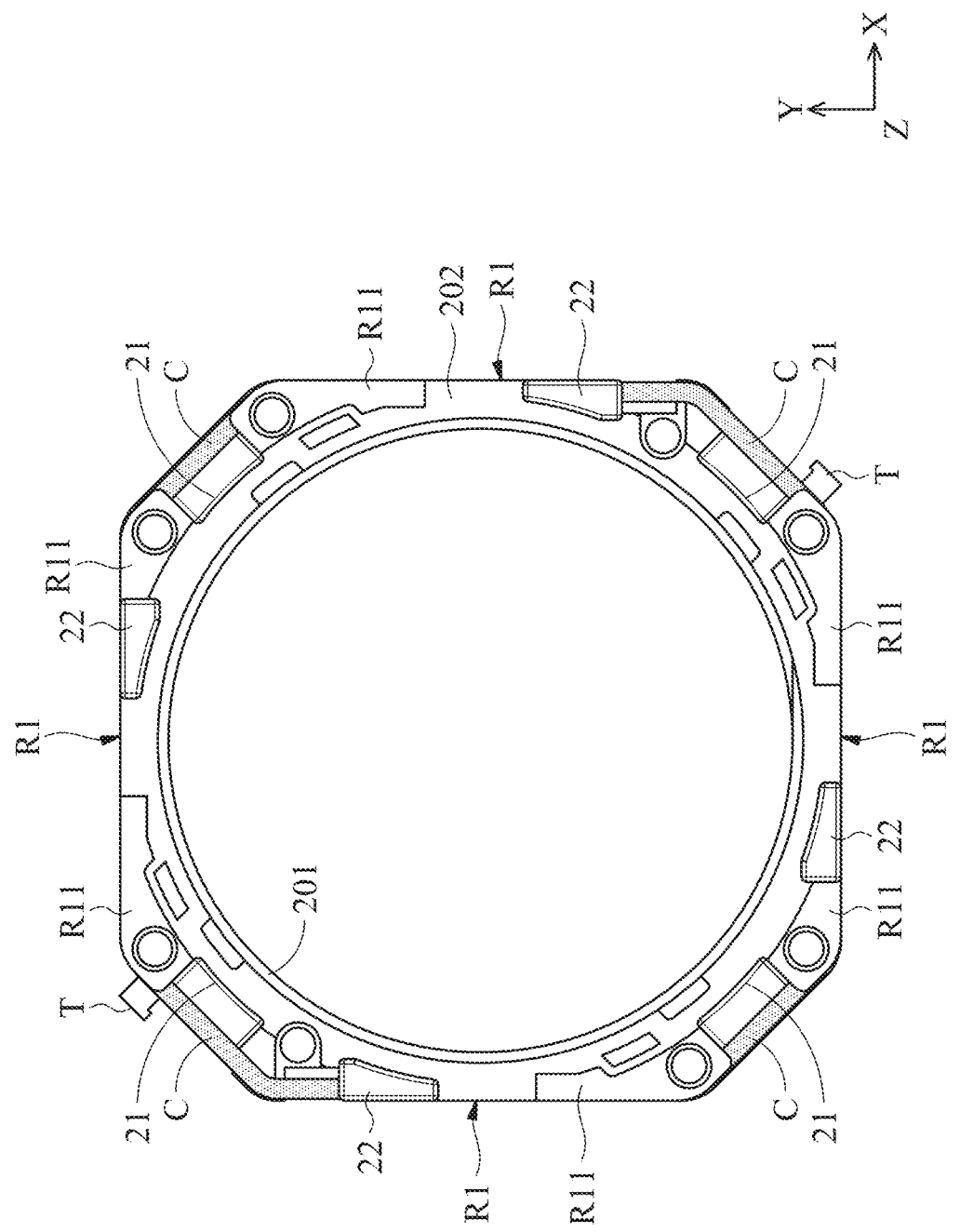
FIG. 5 is a top view of the holder 20 and the coil C disposed around the holder 20 according to an embodiment of the invention.

Referring to FIGS. 3-5, the holder 20 in this embodiment has an annular main body 201 and at least a pair of longitudinal restricting portions R1 and R2 on a side of the main body 201. The lens unit BL is received in the main body 201, and the restricting portions R1 and R2 protrude outward from the main body 201 in an horizontal direction parallel to the XY plane. It should be noted that a slot is formed between the restricting portions R1 and R2 for accommodating and affixing the coil C therein.

As shown in FIG. 3, an annular and flat connection surface 202 is formed on the top side of the main body 201, and four recessed portions 21 are formed at the four corners of the holder 20. In this embodiment, the four recessed portions 21 are concave toward the inside of the main body 201, and each of the restricting portions R1 has an upper surface R11 slightly lower than the connection surface 202.

In another aspect, FIG. 4 shows that the bottom of the holder 20 has a flat connection surface 203 for attaching to the second resilient element S2. With the structures of the recessed portions 21 and the upper surfaces R11 lower than the connection surface 202, the first resilient element S1 can be prevented from excessive impact with the holder 20 when the lens module (the lens unit BL and the holder 20) moves relative to the fixed module (the housing 10 and the base 30) by the magnetic force generated by the coil C and the magnet M. Therefore, accurate and precise positioning during assembly of the optical mechanism can be achieved, and damage to the components within the optical mechanism can also be prevented.

Still referring to FIGS. 3 and 4, the holder 20 further has several protrusions 22 and 23 respectively protruding from the restricting portions R1 and R2. In this embodiment, the protrusions 22 protrude upward from the restricting portions R1 and the connection surface 202 in the Z direction, and the protrusions 23 protrude downward from the restricting portions R2 in the −Z direction. When the holder 20 moves upward or downward relative to the housing 10 and the base 30 along the Z axis, the protrusions 22/23 can contact the housing 10 or the base 30 to restrict the holder 20 in a limit position along the Z axis.

As shown in FIG. 5, the connection surface 202 is formed beside the restricting portions R1. When viewed along the optical axis (Z axis), the coil C at least partially overlaps with the protrusions 22 that are directly formed on the restricting portions R1, so that the size of the holder 20 and the coil C along a horizontal direction can be reduced to achieve miniaturization of the optical mechanism. Additionally, the holder 20 has at least a leg T with a conductive wire wound thereon. In this embodiment, the coil C can be electrically connected to the second resilient element S2 below the holder 20 via the conductive wire, and the second resilient element S2 can be electrically connected to the external circuit via the conductive members P protruding from the base 30.

Figure 6:
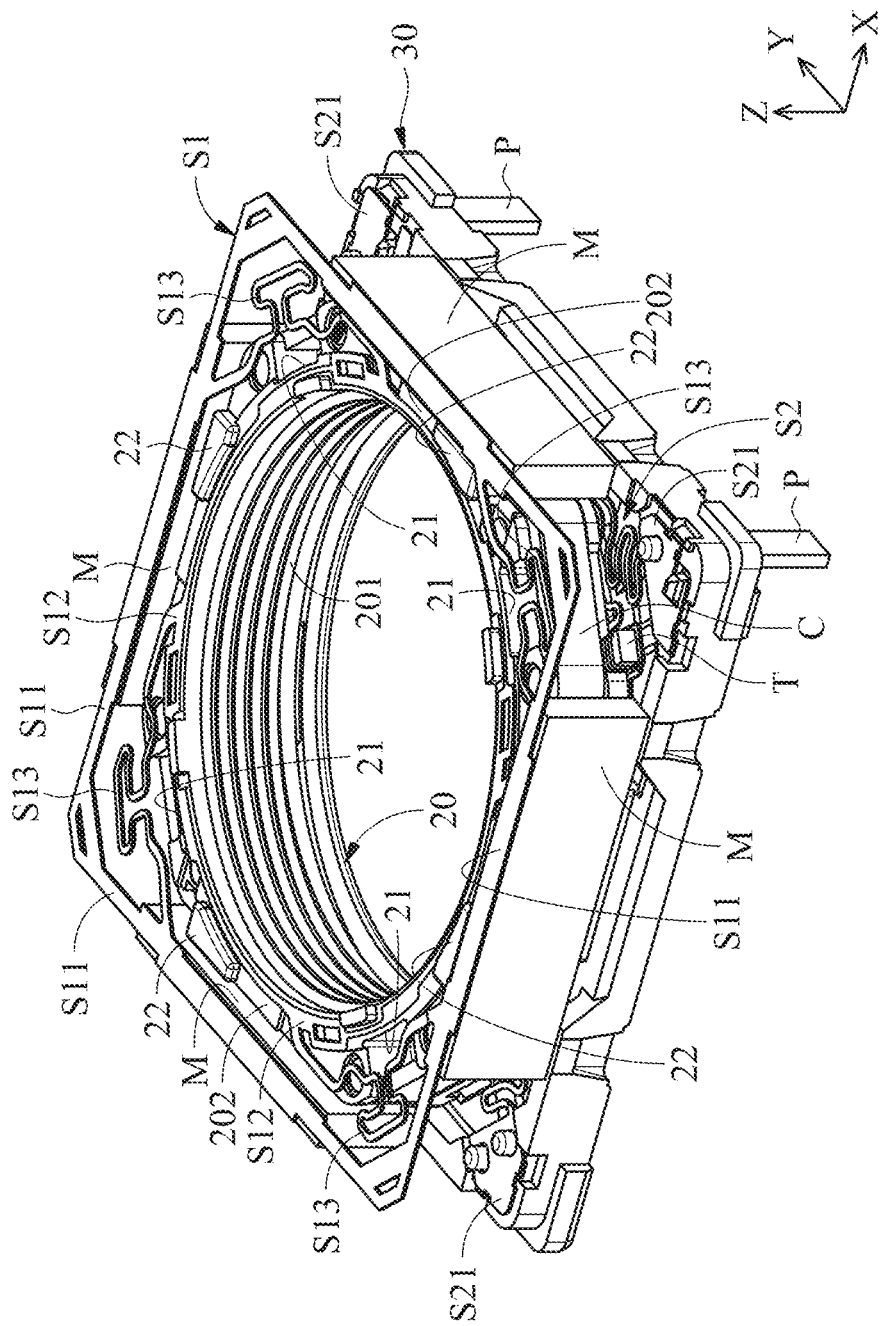
FIGS. 6 and 7 are perspective diagrams showing the internal components of the optical mechanism in FIG. 1 after assembly, wherein the housing 10 is omitted from FIGS. 6 and 7.
Figure 7:
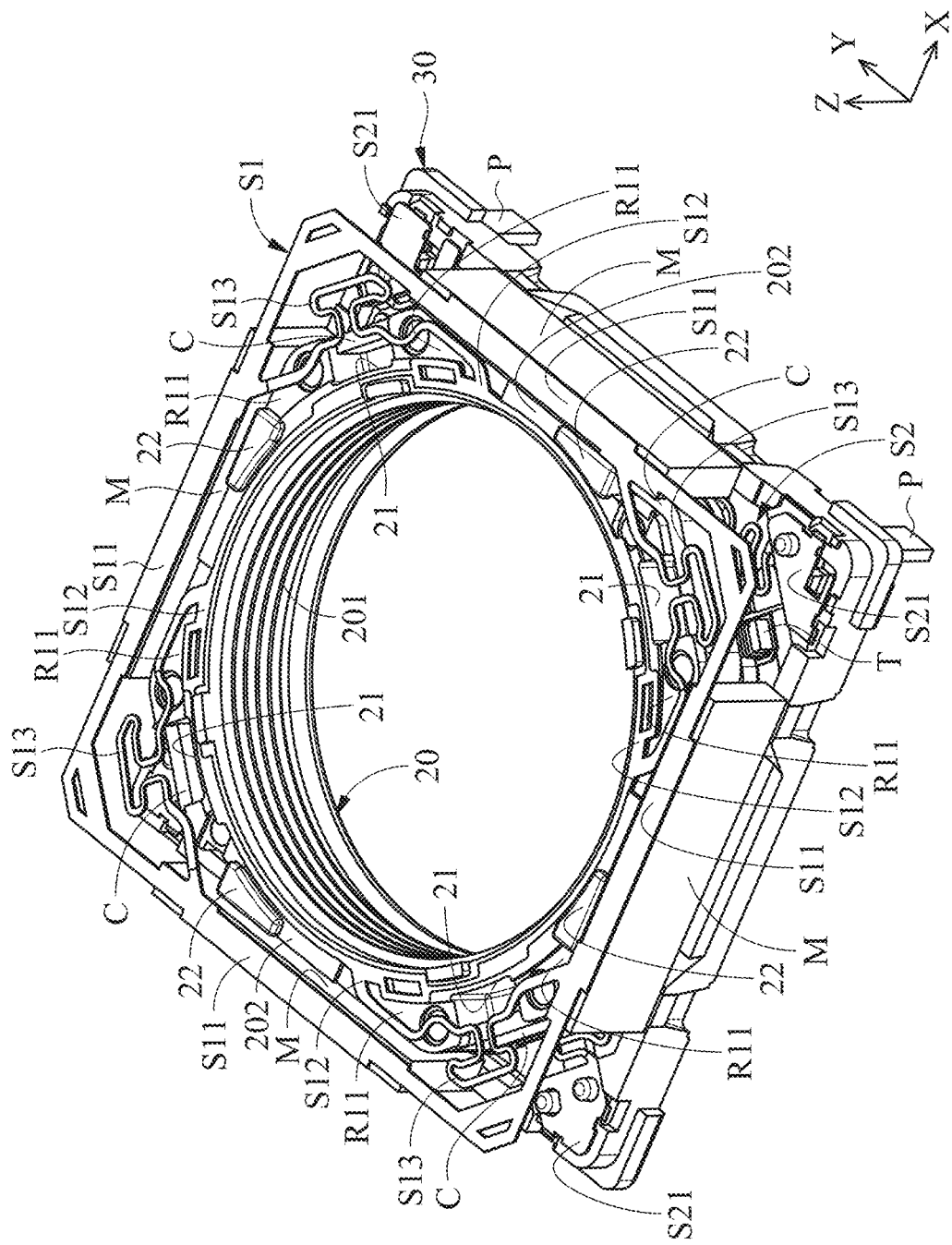
Figure 13:
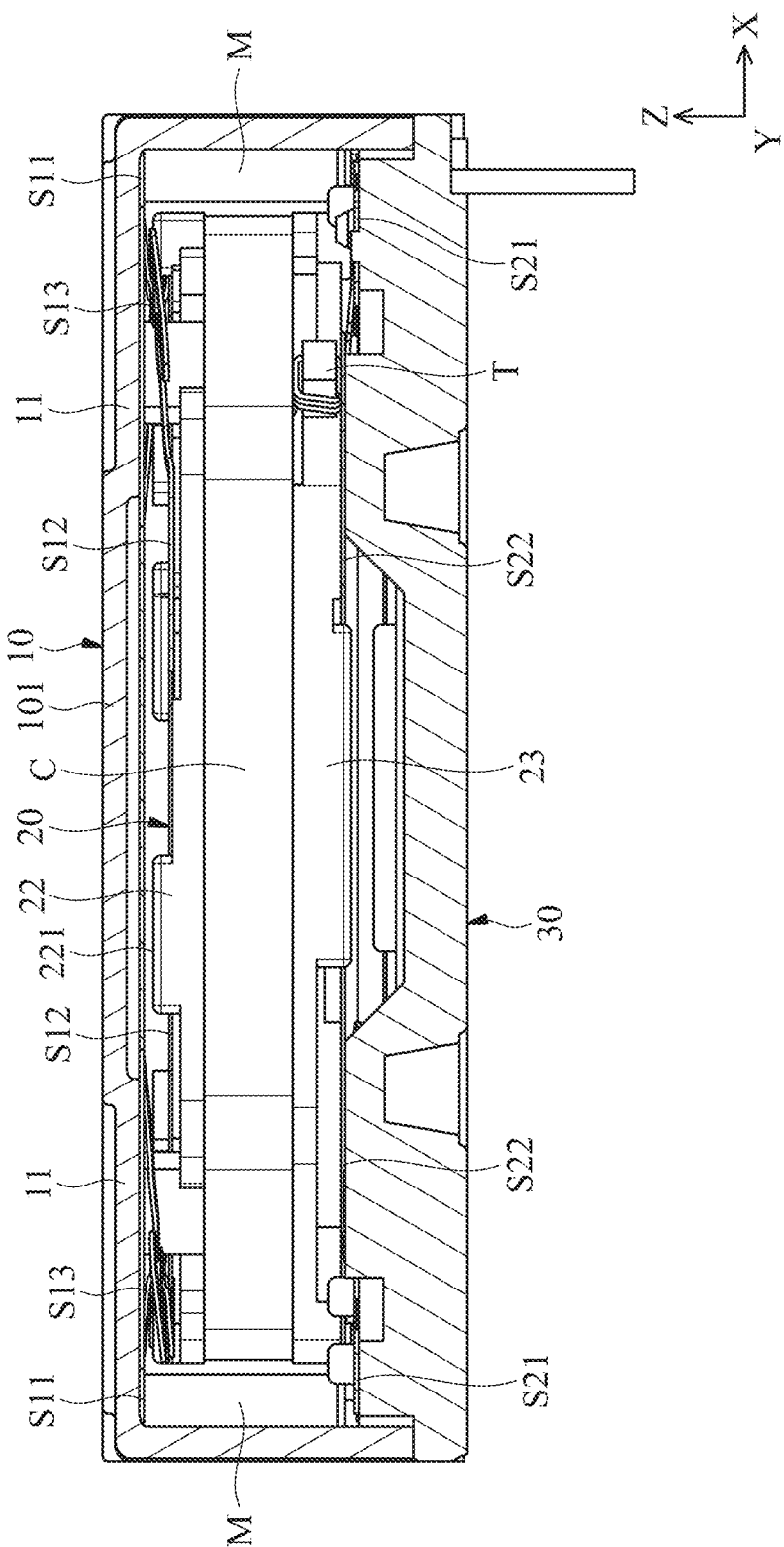
FIG. 13 is a cross-sectional view of the optical mechanism in FIG. 1 after assembly.

Referring to FIGS. 6, 7, and 13, four magnets M are disposed on the four sides of the holder 20 and correspond to the coil C. The first resilient element S1 forms a rectangular first connecting portion S11 which is affixed between the magnets M and an inner surface of the housing 10 (FIG. 13). Additionally, the first resilient element S1 forms several second connecting portions S11 affixed to the connection surface 202 of the holder 20, so that the holder 20 and the lens unit BL received therein can be suspended within the housing 10 and movable relative to the housing 10 and the base 30 along the Z axis.

As shown in FIGS. 6 and 7, the first resilient element S1 further forms four thin deformable portions S13 corresponding to the four corners of the holder 20. It should be noted that the deformable portions S13 are not affixed to the housing 10 or the holder 20, wherein the opposite ends of each deformable portion S13 are respectively connected to the first and second connecting portions S11 and S12. Therefore, when the holder 20 and the lens unit BL move relative to the housing 10 and the base 30 along the Z axis, the suspended deformable portions S13 can deform and generate a spring force.

Figure 8:
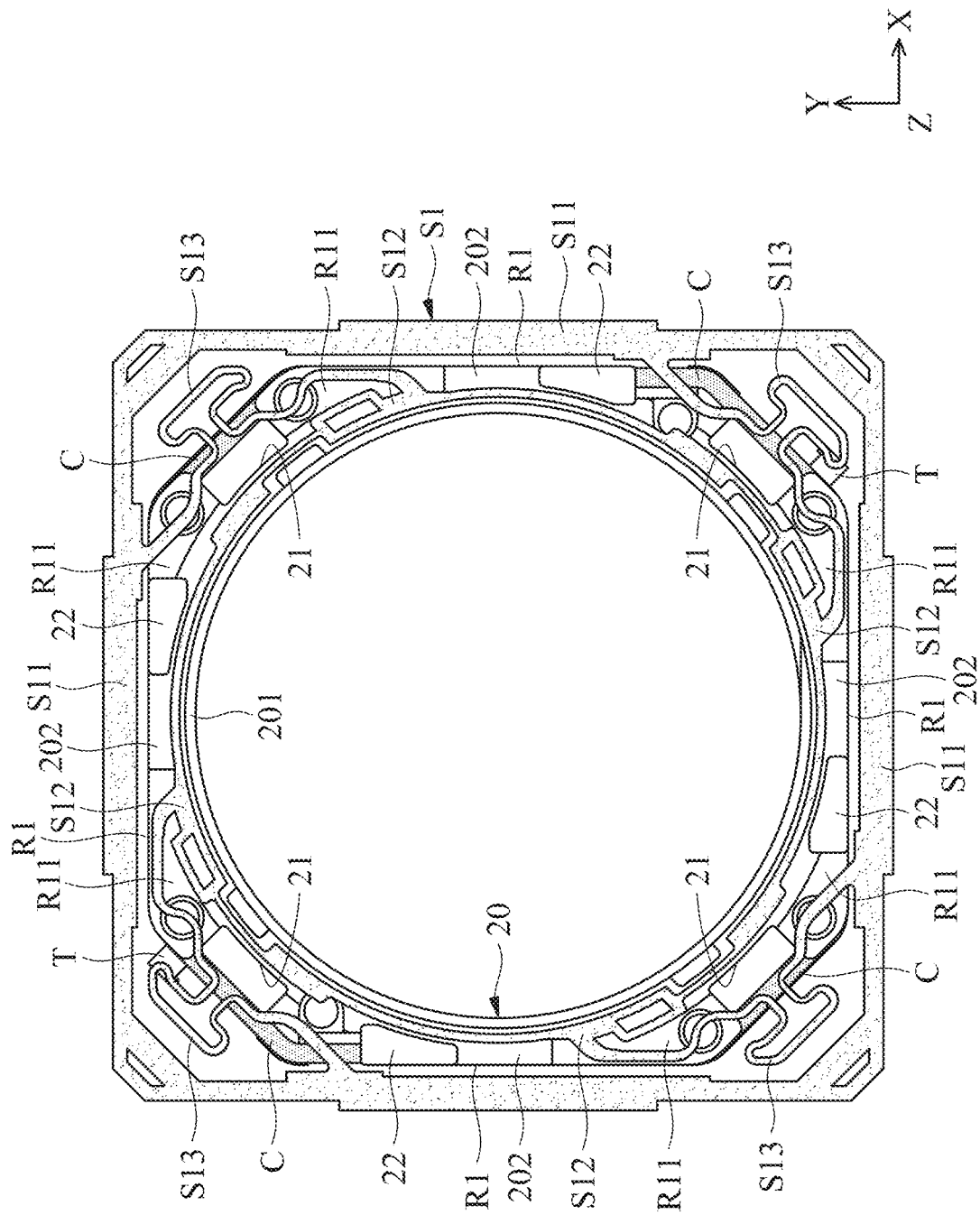
FIG. 8 is a top view of the first resilient element S1, the holder 20, and the coil C after assembly.

Referring to FIGS. 6-8, each of the four deformable portions S13 forms a hollow T-shaped structure, corresponding to the corner of the holder 20. In this embodiment, an upper surface R11 of the restricting portion R1 at the corner of the holder 20 directly faces the deformable portion S13, and the upper surface R11 is spaced apart from the deformable portion S13 along the Z axis by an appropriate distance. Namely, there is no object presented between the upper surface R11 and the deformable portion S13 along the Z axis, whereby the deformable portion S13 can be prevented from impact with other components when shaken or deformed by an external force.

It can also be seen in FIGS. 3-8 that the recessed portions 21 are adjacent to the restricting portions R1 and located between the main body 201 and the coil C. In this embodiment, the recessed portions 21 are concave toward the inside of the main body 201, and the coil C directly faces at least a part of the deformable portion S13 along the Z axis. That is, the holder 20 forms at least one recessed portion 21 adjacent to the restricting portion R1, and there is no object disposed between the coil C and the deformable portion S13 along the Z axis. Therefore, the downward deformation extent of the deformable portion S13 in the −Z direction can be increased, so that particles and structural failure of the mechanism due to collision between the deformable portion S13 and the objects below the deformable portion S13 (e.g. the restricting portion R1 of the holder 20) can be efficiently prevented.

Figure 9:
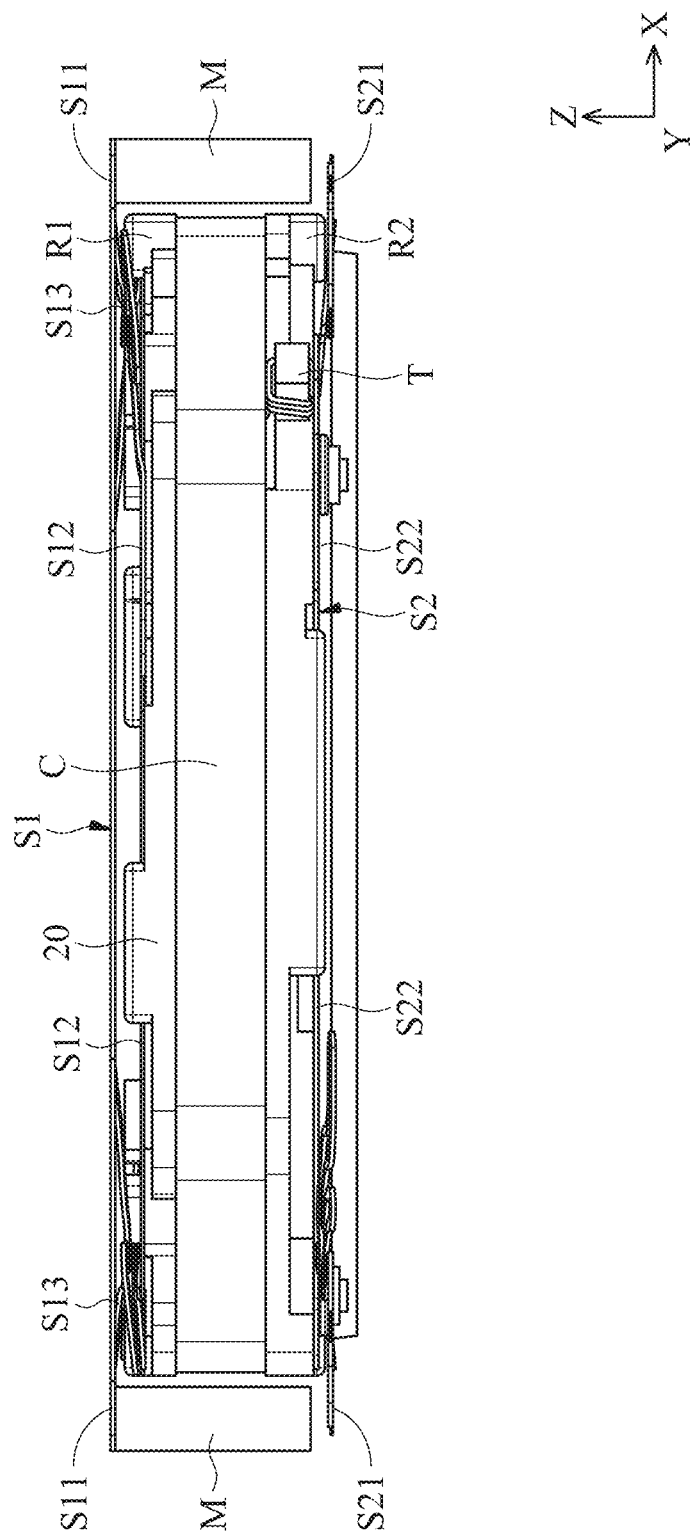
FIG. 9 is a side view showing the internal components of the optical mechanism in FIG. 1 after assembly, wherein the housing 10 and the base 30 are omitted from FIG. 9.
Figure 10:
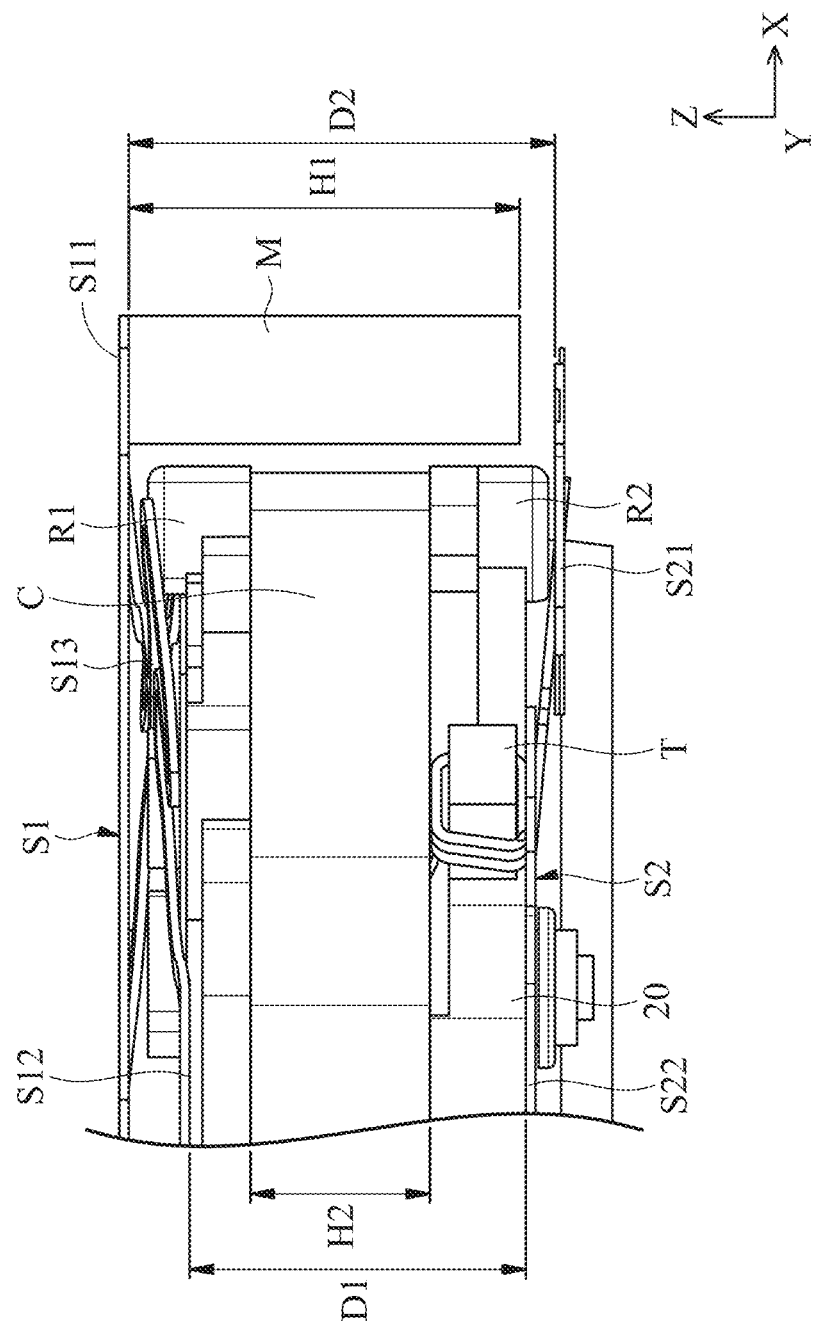
FIG. 10 is a partial enlarged view showing the mechanism on the right side of FIG. 9.

FIG. 10 is a partial enlarged view showing the mechanism on the right side of FIG. 9. Referring to FIGS. 6, 7, 9, 10, and 13, the second resilient element S2 has a third connecting portion S21 affixed to the base 30 and a fourth connecting 22 affixed to the connection surface 203 on a bottom side of the holder 20. In this embodiment, the first and second connecting portions S11 and S12 of the first resilient element S1 are located at different heights (e.g. the first connecting portion S11 is higher than the second connecting portion S12), so that a preload spring force can be applied to the first resilient element S1. Similarly, as the third and fourth connecting portions S21 and S22 are located at different heights (e.g. the third connecting portion S11 is lower than the second connecting portion S12), a preload spring force can be applied to the second resilient element S2.

As shown in FIG. 10, the magnet M has a first height H1 along the Z axis that is greater than the first distance D1 between the second and fourth connecting portions S12 and S22, and the second distance D2 between the first and third connecting portions S11 and S21 is greater than the first height H1 of the magnet M. In addition, the coil C has a second height H2 along the Z axis, and the first height H1 is greater than twice the second height H2, i.e. H1 >2H2.

FIG. 10 further shows that a conductive wire is wound on the leg T of the holder 20 for electrically connecting the coil C above the leg T and the second resilient element S2 below the leg T such as by soldering or welding. Specifically, when viewed along a horizontal direction parallel to the X and Y axes, the leg T and the magnet M at least partially overlap. Moreover, when viewed along a horizontal direction parallel to the X and Y axes, the restricting portion R1 or R2 at least partially overlaps with the magnet M. The configuration described above allows the height of the optical mechanism along the Z direction to be efficiently reduced to facilitate miniaturization of the product.

Figure 12:
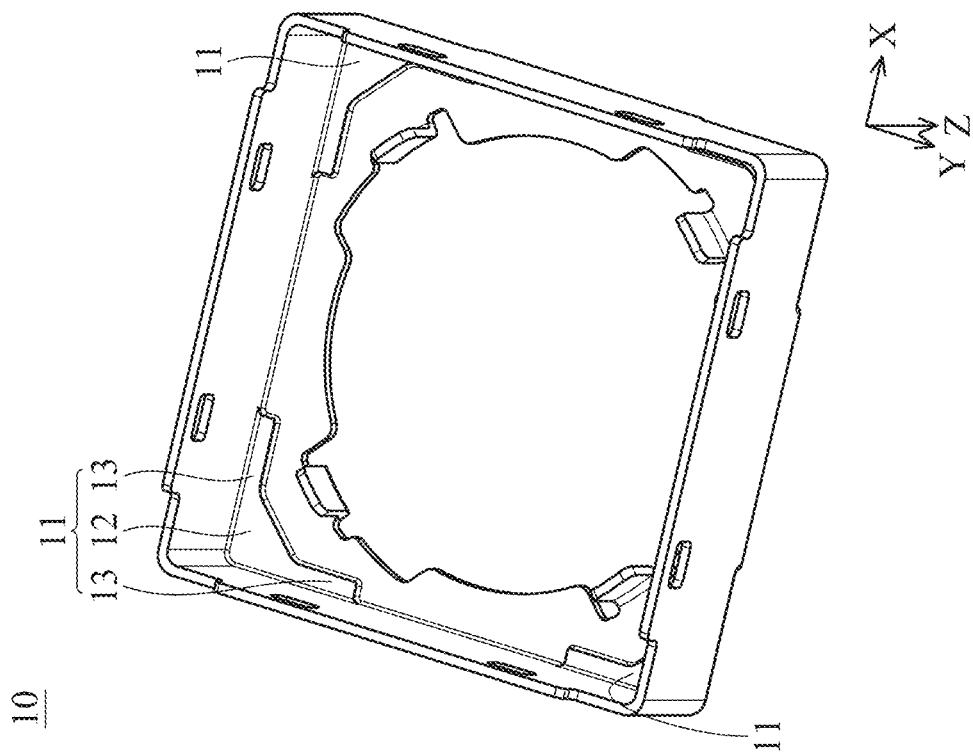
FIGS. 11 and 12 are perspective diagrams showing the housing 10 in FIG. 1 from different viewing angles.
Figure 11:
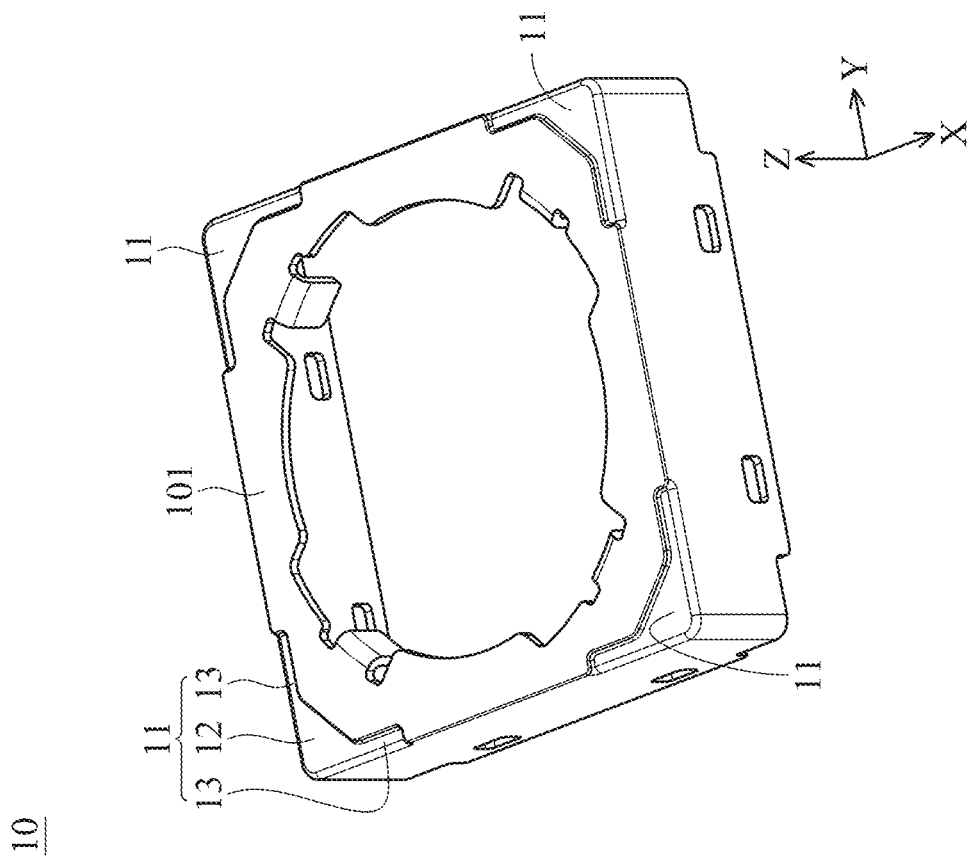

Referring to FIGS. 11 and 12, the housing 10 has a substantially rectangular structure and comprises a top portion 101 and four sidewall portions, wherein at least one depressed structure 11 is formed at the corner of the top portion 101 and located adjacent to at least one of the sidewall portions. As shown in FIG. 12, each of the depressed structures 11 has a substantially triangular main portion 12 and at least a longitudinal portion 13 extending along an edge of the top portion 101. During assembly, the first connecting portion S11 on the outer side of the first resilient element S1 can be adhered to an inner surface of the housing 10 beneath the depressed structure 11, and the second connecting portion S12 can be affixed to the connection surface 202 of the holder 20. Subsequently, the magnet M can be affixed to a lower surface of the first resilient element S1 and the sidewall portion of the housing 10 by adhesion (FIG. 13).

Figure 14:
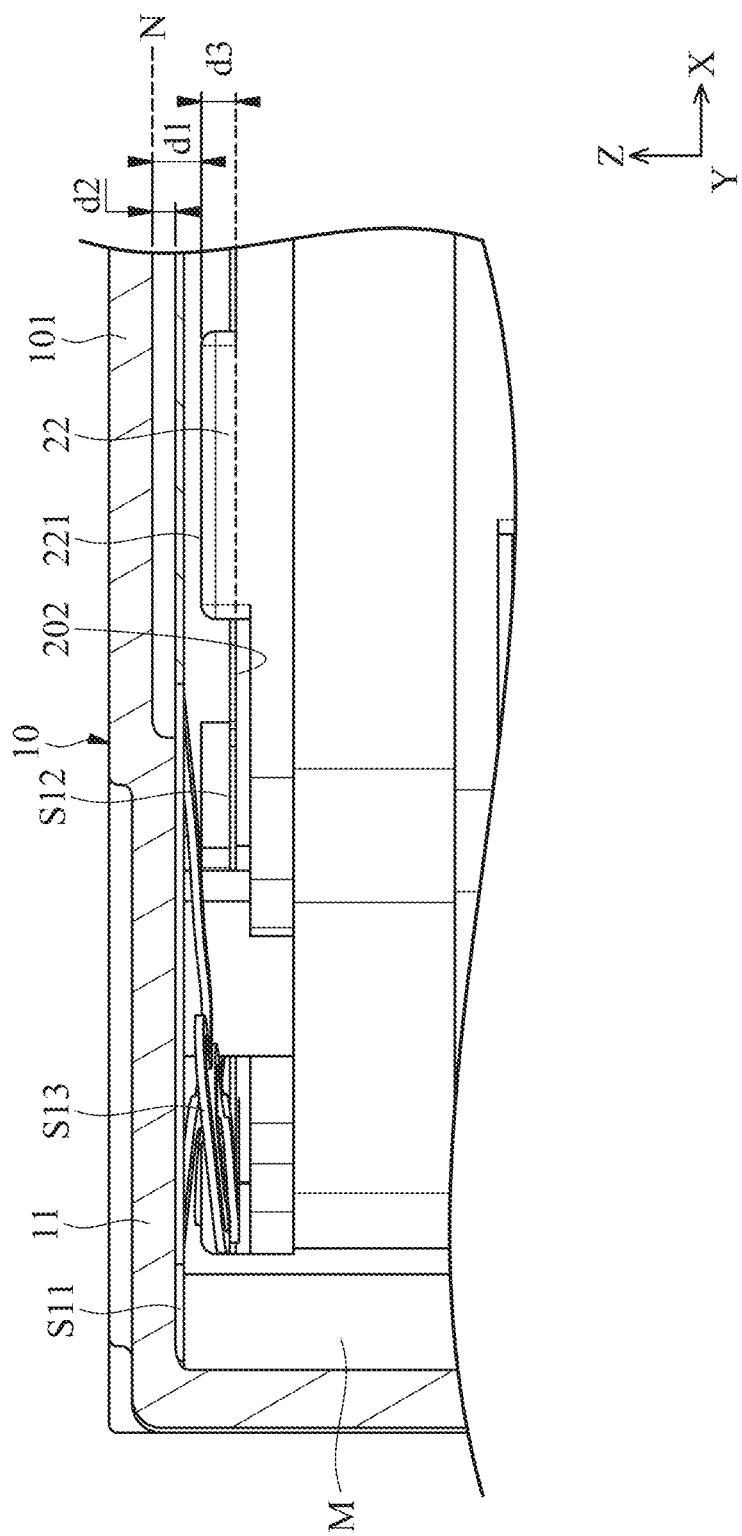
FIG. 14 is a partial enlarged view showing the mechanism at the upper-left corner of FIG. 13.

It should be noted that when the lens module (the lens unit BL and the holder 20) is situated in an initial position before being driven by the magnetic force generated by the coil C and the magnets M, as shown in FIG. 14, the top surface 221 of the protrusion 22 of the holder 20 has a height between the connection surface 202 of the holder 20 and the inner surface of the housing 10 beneath the depressed structure 11 along the Z axis. Additionally, when the lens module is forced to move upward toward the housing 10 to a limit position N, the top surface 221 of the protrusion 22 can contact the housing 10 to restrict the lens module in the limit position N. Similarly, when the lens module moves downward in the −Z direction to another limit position, the protrusion 23 on the bottom side of the holder 20 can contact the base 30 to restrict the lens module in the limit position.

Still referring to FIG. 14, the top surface 221 of the protrusion 22 and the limit position N have a first height difference d1 along the Z axis, the inner surface beneath the depressed structure 11 and the limit position N have a second height difference d2 along the Z axis, and the connection surface 202 and the top surface 221 have a third height difference d3 along the Z axis. In this embodiment, the first height difference d1 is greater than the second height difference d2, and the third height difference d3 is also greater than the second height difference d2, so as to ensure the housing 10 not in contact with any other portion of the holder 20 rather than the protrusion 22. Therefore, structural failures due to collision of the housing 10 and the holder 20 can be prevented, and reliability of the optical mechanism can also be improved.

Figure 15:
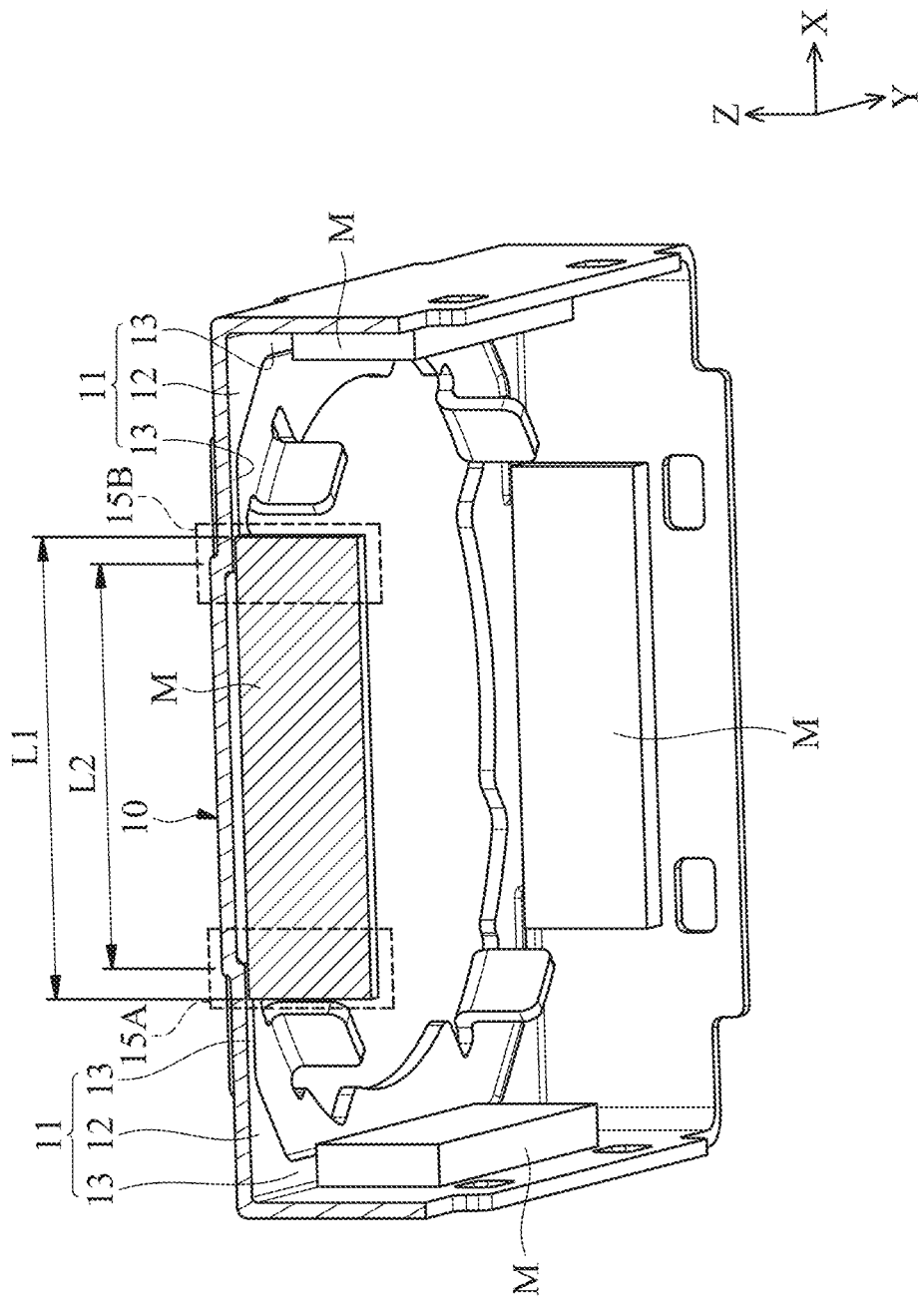
FIG. 15 is a cross-sectional view showing the relative position of the housing H and the magnet M after assembly.

The first resilient element S1 between the housing 10 and the magnet M is omitted from FIG. 15 for easy understanding of the embodiment. As the areas 15A and 15B indicate in FIG. 15, the longitudinal portion 13 of the depressed structure 11 is located corresponding to the magnet M. When viewed along the Z axis, the longitudinal portion 13 at least partially overlaps with the magnet M. Additionally, the length L1 of the magnet M is greater than the distance L2 between two depressed structures 11 along the X axis, so that the magnet M can be stably positioned below and aligned with the longitudinal portions 13 of the two adjacent depressed structures 11.

Figure 16:
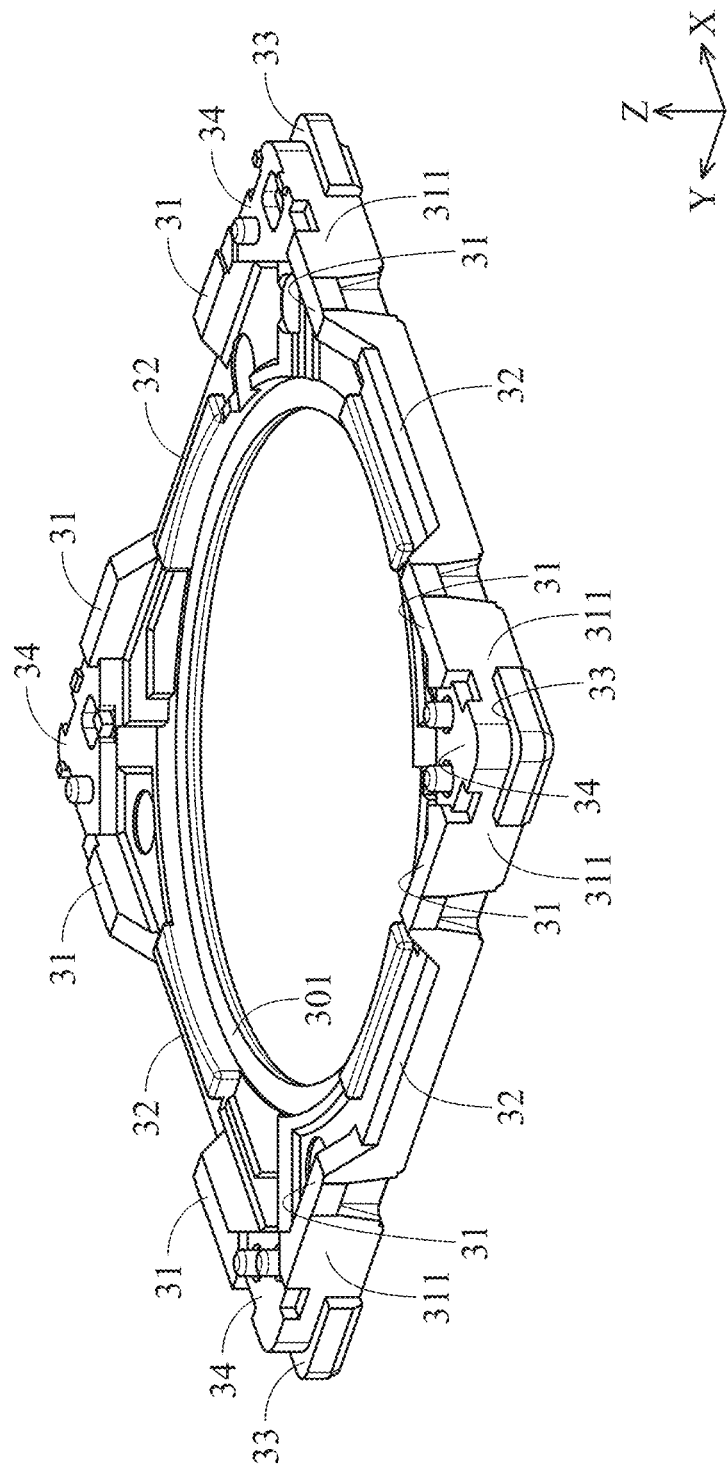
FIG. 16 is a perspective diagram showing the base 30 in FIG. 1.
Figure 17:
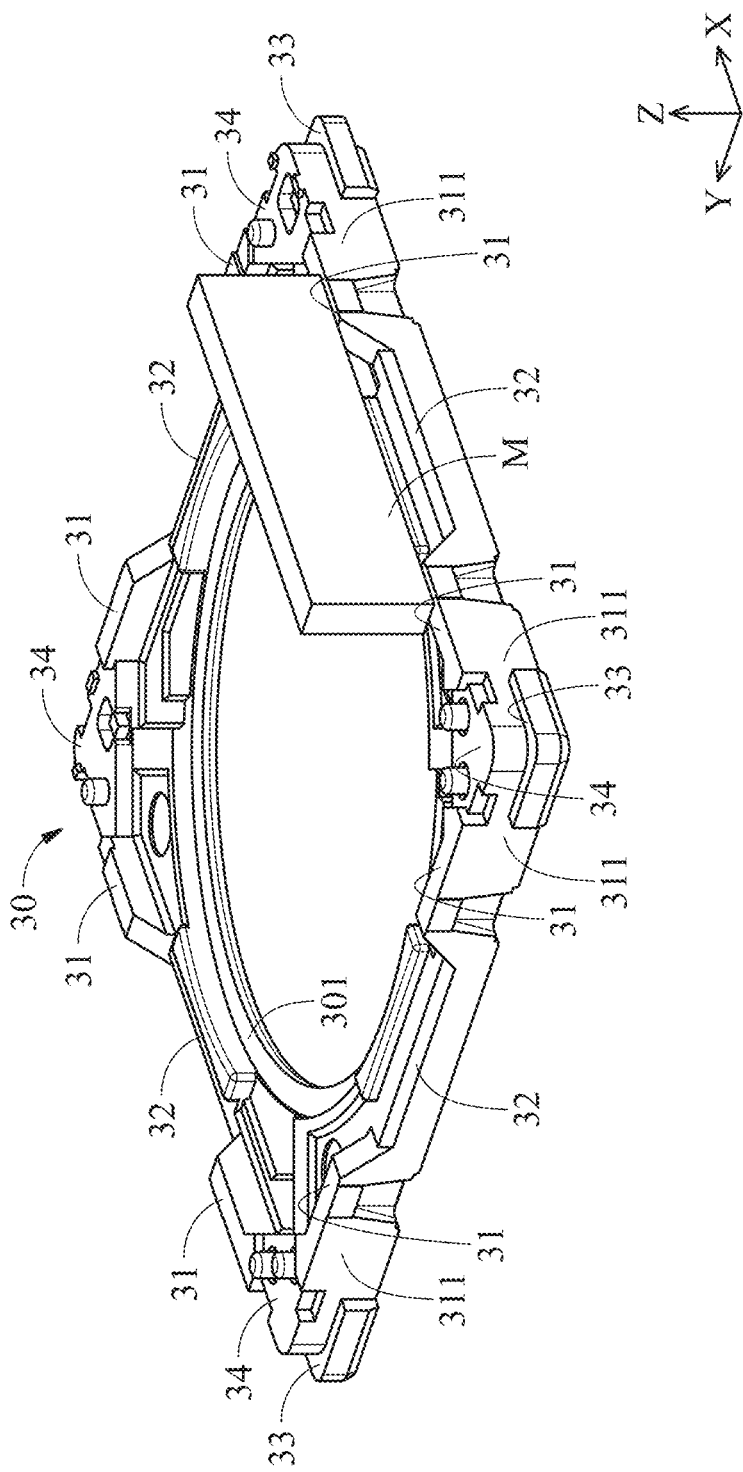
FIG. 17 is a perspective diagram showing the relative position of the base 30 and a magnet M in FIG. 1 after assembly.
Figure 18:
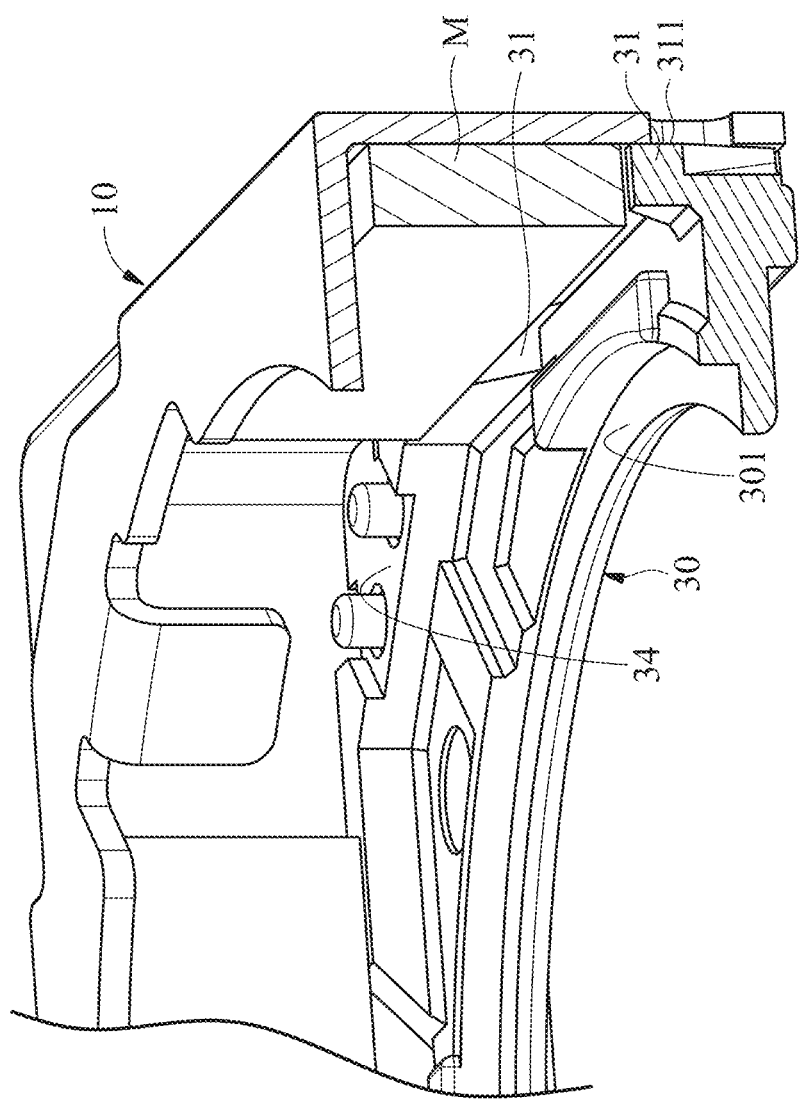
FIG. 18 is a partial cross-sectional view showing the relative position of the housing 10, the base 30, and a magnet M in FIG. 1 after assembly.
Figure 19:
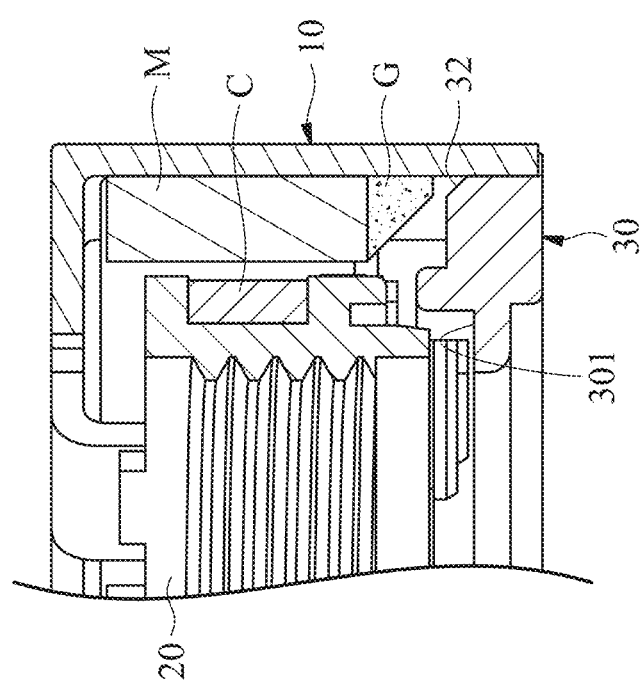
FIG. 19 is a partial cross-sectional view showing a recess 32 of the base 30 that forms a sloped surface for accommodating and guiding the glue G.

Referring to FIGS. 16-19, the base 30 in this embodiment may comprise plastic material and have a substantially rectangular structure. Specifically, as shown in FIG. 17, the base 30 has a bottom plate 301 and at least one protrusion 31 extended toward the magnet M from a side of the bottom plate 301, wherein a recess 32 may be formed between two protrusions 31 on a side of the bottom plate 301 and corresponding to the magnet M. FIG. 19 shows that the recess 32 forms a sloped surface 32 extending toward the housing 10 to an edge of the base 30, whereby the glue G for adhering the magnet M to the housing 10 can be received and guided to prevent overflow of the glue G.

It should be noted that each of the protrusions 31 has an outer surface 311 adjacent to the housing 10, as shown in FIGS. 16-18. The outer surface 311 is substantially parallel to the Z axis and pushes against the housing 10. Additionally, FIG. 17 shows that the base 30 forms at least an L-shaped abutting surface 33 located at the corner and perpendicular to the Z axis. During assembly, the abutting surface 33 abuts the housing 10 to facilitate positioning between the base 30 and the housing 10 along the Z axis and increase the structural strength of the entire optical mechanism.

Referring to FIGS. 16-21, at least a fixed surface 34 for connecting to the second resilient element S2 is formed at the corner of the base 30 and perpendicular to the Z axis. In this embodiment, an end portion (third connecting portion S21) of the second resilient element S2 is affixed to the fixed surface 34, and the end portion can be further electrically connected to the conductive member P on the base 30 by soldering or welding. Therefore, the coil C can be electrically connected to the conductive member P through the second resilient element S2 and the conductive wire wound on the leg T.

Figure 20:
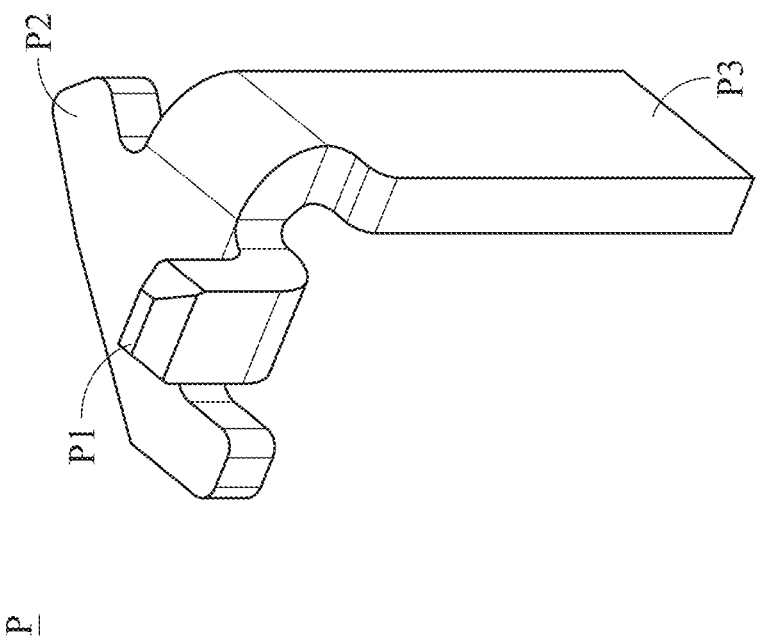
FIG. 20 is a perspective diagram showing a conductive member P according to an embodiment of the invention.
Figure 21:
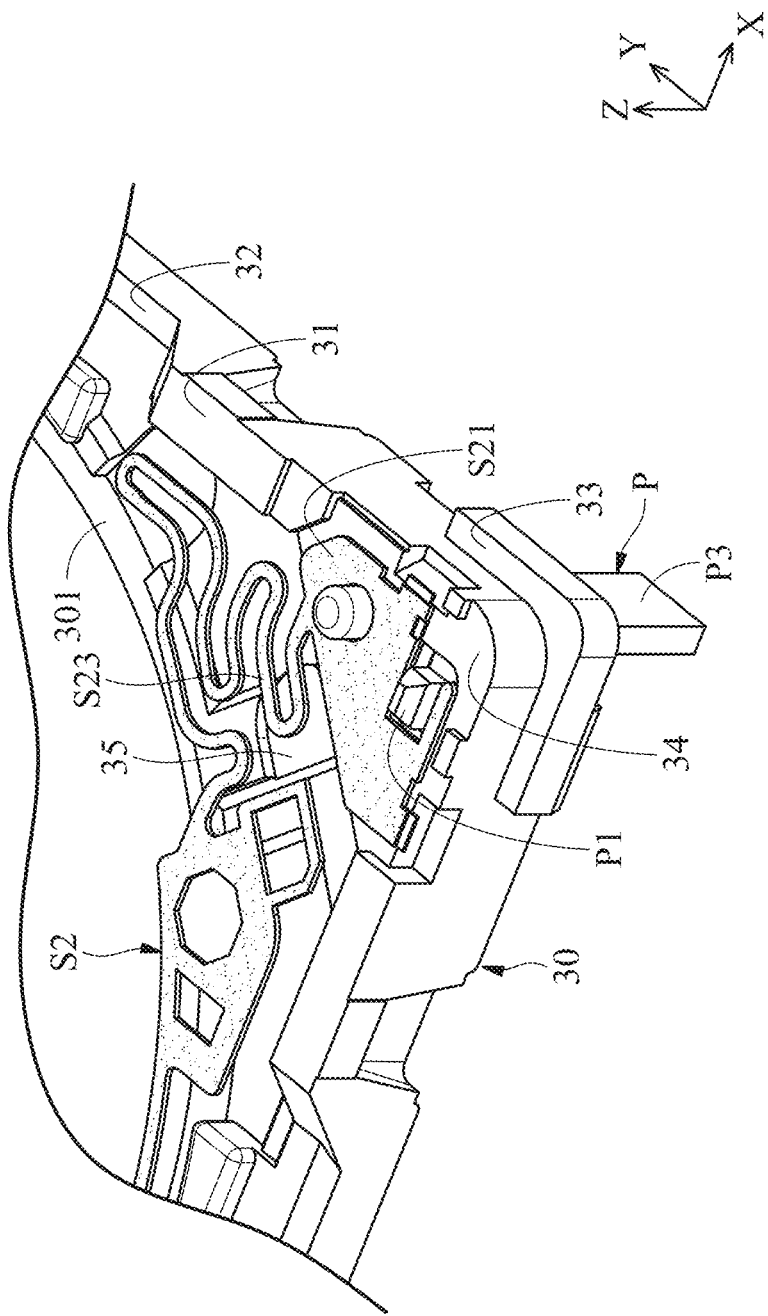
FIG. 21 is a partial enlarged perspective view showing the third connecting portion S21 of the second resilient element S2 affixed to the fixed surface 34 of the base 30.
Figure 22:
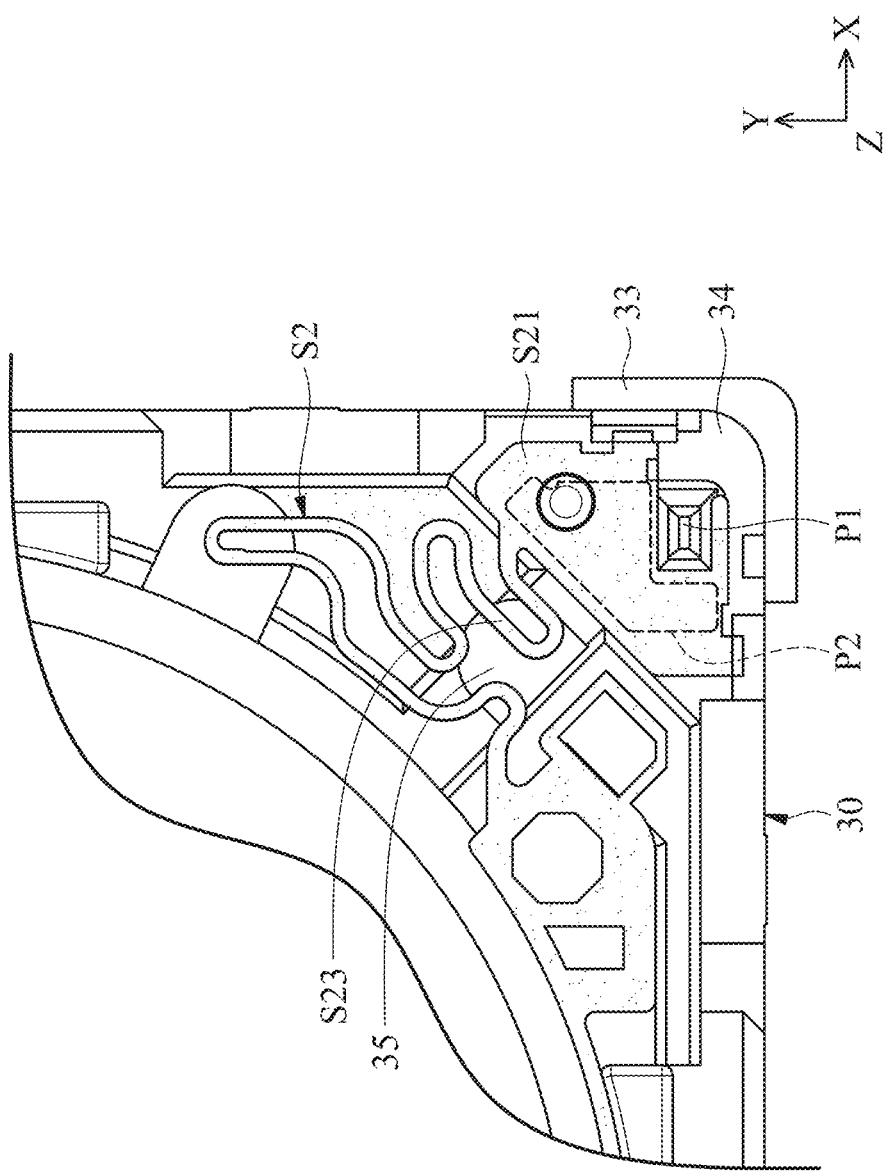
FIG. 22 is a partial enlarged top view showing that the projection area of the embedded portion P2 onto the fixed surface 34 is smaller than the projection area of the third connecting portion S21 onto the fixed surface 34.

As shown in FIGS. 20 and 21, the conductive member P in this embodiment has a head portion P1, an embedded portion P2, and a leg portion P3. The head portion P1 protrudes from the fixed surface 34 of the base 30, the embedded portion P2 is embedded in the base 30, and the leg portion P3 extends from the bottom of the base 30. It should be noted that the projection area of the embedded portion P2 onto the fixed surface 34 is smaller than the projection area of the third connecting portion S21 onto the fixed surface 34, as shown in FIG. 22. For example, the embedded portion P2 may be embedded in the plastic base 30 by insert molding. Therefore, a sufficient adhesion area between the end portion (third connecting portion S21) of the second resilient element S2 and the base 30 can be ensured to increase the mechanical strength and reliability of the optical mechanism.

Referring to FIGS. 21 and 22, the second resilient element S2 has at least a suspended deformable portion S23 connecting the third connecting portion S21 affixed to the base 30 with the fourth connecting portion S222 affixed to the holder 20. Additionally, the base 30 forms a cavity 35 concave toward the −Z direction and located corresponding to the deformable portion S23, wherein there is no object presented between the cavity 35 and the deformable portion S23 along the Z axis. Hence, the downward deformation extent of the deformable portion S23 in the −Z direction can be increased, and when the deformable portion S23 is shaken or deformed by an external force, particles and structural failure of the mechanism due to collision between the deformable portion S23 and the object below the deformable portion S23 (e.g. the base 30) can be efficiently prevented.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present application. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An optical mechanism, comprising:
   a movable module, for connecting an optical element, and comprising a holder, wherein the holder comprises:
   a hollow main body, having a connection surface; and
   a restricting portion, having an upper surface and protruding outward from the main body in a horizontal direction perpendicular to an optical axis of the optical element;
   a fixed module, wherein the movable module moves relative to the fixed module within a moving range;
   a driving assembly, having a coil and a magnet for driving the movable module to move relative to the fixed module, wherein the restricting portion restricts the coil in a predetermined position on the holder;
   a first resilient element, having a first connecting portion, a second connecting portion, and a deformable portion connecting the first connecting portion with the second connecting portion, wherein the first and second connecting portions respectively connect to the fixed module and the connection surface of the main body, and the upper surface faces the deformable portion; and
   a second resilient element having a third connecting portion and a fourth connecting portion respectively connected to the fixed module and the holder, wherein the magnet has a first height along the optical axis, a first distance is formed between the second and fourth connecting portions along the optical axis, and the first height is greater than the first distance;
   wherein when the movable module is located at any position within the moving range, the upper surface and the first resilient element are spaced apart from each other and at least partially overlap along the optical axis.

2. The optical mechanism as claimed in claim 1, wherein the holder further comprises a recessed portion adjacent to the restricting portion and between the main body and the coil, wherein the recessed portion is concave toward an inside of the main body, and the coil directly faces at least a part of the deformable portion along the optical axis.

3. The optical mechanism as claimed in claim 1, wherein the deformable portion forms a hollow T-shaped structure.

4. The optical mechanism as claimed in claim 1, further comprising a conductive wire connected to the coil, wherein the holder further has a leg with the conductive wire wound thereon, wherein the leg and the magnet at least partially overlap when viewed along the horizontal direction.

5. The optical mechanism as claimed in claim 1, wherein a second distance is formed between the first and third connecting portions along the optical axis, and the second distance is greater than the first height.

6. The optical mechanism as claimed in claim 1, further comprising a barrel, wherein the barrel is affixed in the holder and the optical element is affixed in the barrel.

7. The optical mechanism as claimed in claim 6, wherein the holder further comprises a first material and the barrel comprises a second material.

8. The optical mechanism as claimed in claim 1, further comprising a housing forming an inner surface, wherein the housing has a top portion and four sidewall portions, and a depressed structure is formed at a corner of the top portion and located adjacent to one of the four sidewall portions, wherein the depressed structure and the magnet at least partially overlap when viewed along the optical axis.

9. The optical mechanism as claimed in claim 8, further comprising a base and a conductive member, wherein the second resilient element connects the base with the holder, the housing is affixed to the base, and the conductive member is electrically connected to the coil and has an embedded portion embedded in the base, wherein the base forms a fixed surface, and the second resilient element has an end portion affixed to the fixed surface, wherein a projection area of the embedded portion onto the fixed surface is smaller than a projection area of the end portion onto the fixed surface.

10. An optical mechanism, comprising:
a movable module, for connecting an optical element, and comprising a holder, wherein the holder comprises:
a hollow main body, having a connection surface; and
a restricting portion, having an upper surface and protruding outward from the main body in a horizontal direction perpendicular to an optical axis of the optical element;
a fixed module, wherein the movable module moves relative to the fixed module within a moving range;
a driving assembly, having a coil and a magnet for driving the movable module to move relative to the fixed module, wherein the restricting portion restricts the coil in a predetermined position on the holder;
a first resilient element, having a first connecting portion, a second connecting portion, and a deformable portion connecting the first connecting portion with the second connecting portion, wherein the first and second connecting portions respectively connect to the fixed module and the connection surface of the main body, and the upper surface faces the deformable portion; and
a housing, forming an inner surface,
wherein when the movable module is located at any position within the moving range, the upper surface and the first resilient element are spaced apart from each other and at least partially overlap along the optical axis,
wherein the housing has a top portion and four sidewall portions, and a depressed structure is formed at a corner of the top portion and located adjacent to one of the four sidewall portions, wherein the depressed structure and the magnet at least partially overlap when viewed along the optical axis, and
wherein the depressed structure comprises a substantially triangular main portion and a longitudinal portion extending along an edge of the top portion, and the longitudinal portion and the magnet at least partially overlap when viewed along the optical axis.

11. The optical mechanism as claimed in claim 8, further comprising a quadrilateral base forming an abutting surface located at a corner of the quadrilateral base, perpendicular to the optical axis, and abutting the housing.

12. The optical mechanism as claimed in claim 8, further comprising a quadrilateral base having a bottom plate and a protrusion protruding from the bottom plate and toward the magnet, wherein the protrusion of the quadrilateral base forms an outer surface adjacent to the housing and substantially parallel to the optical axis.

13. The optical mechanism as claimed in claim 12, wherein the quadrilateral base further comprises two protrusions and a recess, and the recess is formed between the two protrusions of the quadrilateral base and corresponds to the magnet.

14. An optical mechanism, comprising:
a movable module, for connecting an optical element, and comprising a holder, wherein the holder comprises:
a hollow main body, having a connection surface;
a restricting portion, having an upper surface and protruding outward from the main body in a horizontal direction perpendicular to an optical axis of the optical element;
a fixed module, wherein the movable module moves relative to the fixed module within a moving range;
a driving assembly, having a coil and a magnet for driving the movable module to move relative to the fixed module, wherein the restricting portion restricts the coil in a predetermined position on the holder;
a first resilient element, having a first connecting portion, a second connecting portion, and a deformable portion connecting the first connecting portion with the second connecting portion, wherein the first and second connecting portions respectively connect to the fixed module and the connection surface of the main body, and the upper surface faces the deformable portion;
a housing, forming an inner surface; and
a quadrilateral base, having a bottom plate and two protrusions each protruding from the bottom plate and toward the magnet;
wherein when the movable module is located at any position within the moving range, the upper surface and the first resilient element are spaced apart from each other and at least partially overlap along the optical axis;
wherein the housing has a top portion and four sidewall portions, and a depressed structure is formed at a corner of the top portion and located adjacent to one of the four sidewall portions, wherein the depressed structure and the magnet at least partially overlap when viewed along the optical axis;
wherein the protrusions of the quadrilateral base each forms an outer surface adjacent to the housing and substantially parallel to the optical axis;
wherein the quadrilateral base further comprises a recess, and the recess is formed between the two protrusions of the quadrilateral base and corresponds to the magnet;
wherein the recess forms a sloped surface that extends toward the housing to an edge of the quadrilateral base.

15. An optical mechanism, comprising:
a movable module, for connecting an optical element, and comprising a holder, wherein the holder comprises:
a hollow main body, having a connection surface; and a restricting portion, having an upper surface and protruding outward from the main body in a horizontal direction perpendicular to an optical axis of the optical element;

a fixed module, wherein the movable module moves relative to the fixed module within a moving range;

a driving assembly, having a coil and a magnet for driving the movable module to move relative to the fixed module, wherein the restricting portion restricts the coil in a predetermined position on the holder;

a first resilient element, having a first connecting portion, a second connecting portion, and a deformable portion connecting the first connecting portion with the second connecting portion, wherein the first and second connecting portions respectively connect to the fixed module and the connection surface of the main body, and the upper surface faces the deformable portion; and a housing, forming an inner surface;

wherein when the movable module is located at any position within the moving range, the upper surface and the first resilient element are spaced apart from each other and at least partially overlap along the optical axis, wherein the housing has a top portion and four sidewall portions, and a depressed structure is formed at a corner of the top portion and located adjacent to one of the four sidewall portions, wherein the depressed structure and the magnet at least partially overlap when viewed along the optical axis, and wherein the holder further comprises a protrusion protruding from the connection surface toward the housing, and the protrusion of the holder has a top surface facing the housing, wherein the protrusion of the holder is covered by the housing along the optical axis.

16. The optical mechanism as claimed in claim 15, wherein the connection surface is located on a side of the restricting portion, and the protrusion of the holder directly connects to the restricting portion, wherein the coil and the protrusion of the holder at least partially overlap when viewed along the optical axis.

17. The optical mechanism as claimed in claim 15, wherein the first resilient element connect the inner surface of the housing with the connection surface of the holder, wherein when the movable module is in an initial position relative to the housing, the top surface of the protrusion of the holder has a height between the connection surface and the inner surface, and when the movable module moves toward the housing to a limit position, the top surface contacts the housing to restrict the movable module in the limit position.

18. The optical mechanism as claimed in claim 17, wherein the top surface of the protrusion of the holder and the limit position have a first height difference along the optical axis, and the inner surface and the limit position have a second height difference along the optical axis, wherein the first height difference is greater than the second height difference.

19. The optical mechanism as claimed in claim 18, wherein the connection surface and the top surface have a third height difference along the optical axis, and the third height difference is greater than the second height difference.

* * * * *